United States Patent
Spragg et al.

(10) Patent No.: US 6,439,288 B1
(45) Date of Patent: Aug. 27, 2002

(54) PNEUMATIC TIRE WITH VARIABLE THICKNESS BAND ELEMENT

(75) Inventors: Charles D. Spragg, Hudson; Stephen M. Vossberg, Medina; James M. Kirby, Akron, all of OH (US); Edward G. Markow, Jensen Beach, FL (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 115 days.

(21) Appl. No.: 09/723,971

(22) Filed: Nov. 28, 2000

(51) Int. Cl.⁷ .................. B60C 9/18; B60C 17/00; B60C 19/12
(52) U.S. Cl. .................. 152/533; 152/197; 152/516
(58) Field of Search .................. 152/538, 533, 152/516, 526, 197, 198, 200

(56) References Cited

U.S. PATENT DOCUMENTS

| | | |
|---|---|---|
| 1,411,516 A | 4/1922 | Reider |
| 2,017,710 A | 10/1935 | Minor |
| 3,842,885 A | 10/1974 | Alban |
| 3,850,219 A | 11/1974 | Snyder |
| 3,933,566 A | 1/1976 | Seiberling |
| 4,094,354 A | 6/1978 | Ferrell et al. |
| 4,111,249 A | 9/1978 | Markow |
| 4,287,924 A | 9/1981 | Deck et al. |
| 4,318,434 A | 3/1982 | Markow |
| 4,428,411 A | 1/1984 | Markow et al. |
| 4,456,048 A | 6/1984 | Markow et al. |
| 4,459,167 A | 7/1984 | Markow et al. |
| 4,673,014 A | 6/1987 | Markow |
| 4,734,144 A | 3/1988 | Markow |
| 4,794,966 A | 1/1989 | Markow |
| 4,989,658 A | 2/1991 | Maathuis et al. |
| 5,368,082 A | 11/1994 | Oare et al. |
| 5,427,166 A | 6/1995 | Willard, Jr. |
| 5,795,417 A | 8/1998 | Damke et al. |
| 5,879,484 A | 3/1999 | Spragg et al. |
| 6,112,791 A | 9/2000 | Spragg et al. |
| 6,117,258 A | 9/2000 | Spragg et al. |
| 6,148,885 A | 11/2000 | Spragg et al. |

FOREIGN PATENT DOCUMENTS

| | | |
|---|---|---|
| EP | 0 016 686 A1 | 3/1980 |
| EP | 0 191 124 B1 | 1/1991 |
| EP | 0 537 780 A2 | 4/1993 |
| EP | 0 400 859 B1 | 3/1994 |
| EP | 1 010 549 A2 * | 6/2000 |
| EP | 1 167 081 A1 | 1/2002 |
| FR | 1.290.231 A | 5/1962 |
| FR | 2 575 423 A1 | 7/1986 |
| JP | 63141809 | 12/1986 |

OTHER PUBLICATIONS

Derwent Abstract of EPO Publication 0 191 124.

* cited by examiner

*Primary Examiner*—Adrienne C. Johnstone
(74) *Attorney, Agent, or Firm*—Meredith E. Palmer; Michael Sand

(57) ABSTRACT

A run flat pneumatic tire has a thin annular band embedded in the crown portion of the tire. The band is formed of a multilayer composite formed of wound layers of a material such as fiberglass and/or graphite impregnated with a resin. The band has a radial cross-sectional thickness with a neutral axis extending through the center in an axial direction. The radial thickness of the band decreases from an axial midpoint toward outer ends of the band to provide greater thickness in the center of the band to reduce interlaminar shear fatigue.

13 Claims, 4 Drawing Sheets

PNEUMATIC TIRE WITH VARIABLE THICKNESS BAND ELEMENT

BACKGROUND OF THE INVENTION

1. Technical Field

The invention relates to vehicle tires and particularly to a run flat pneumatic tire containing a thin annular band which acts as a structural compression member when the tire is in the unpressurized or uninflated state to enable the tire to run in this condition. More particularly, the invention relates to a composite band element comprising a plurality of wound layers of strip material contained in a resin matrix which has a varying radial thickness to enhance the tire ride quality and band element durability for both inflated and uninflated conditions.

2. Background Information

Various tire constructions have been devised over the years which enable a tire to run in an under-inflated or non-inflated condition, such as after receiving a puncture and loss of pressurized air for extended periods of time and at relatively high speeds. This enables the operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the sidewalls of the tire which enable the tire to support the vehicle weight even with the complete loss of internal air pressure. Some examples of such prior art run flat tire constructions which use such sidewall inserts are shown in U.S. Pat. Nos. 4,287,924; 4,365,659; 4,917,164; and 4,929,684.

In addition to these prior art run flat tires having sidewall reinforcements, various run flat tire constructions have been developed which utilize a thin annular band element which extends circumferentially throughout the tire beneath the tread area in the crown portion of the tire. Some examples of such banded run flat tires are shown in U.S. Pat. Nos. 4,673,014; 4,794,966; and 4,456,048.

Banded tire elements have been fabricated with materials made of steel, aluminum, titanium, and epoxy and thermoplastic composites with glass, KEVLAR (aromatic polyammide) and graphite fiber reinforcement. A possible failure mode with these lightweight, laminated band constructions is interlaminar shear which usually occurs along the band's primary bending or neutral axis. This is a fatigue failure and is directly related to the spectrum of cyclic operating stress. As in all fatigue failures, the lower the stress, the longer the operating life.

Various band element configurations have been developed in an attempt to eliminate or materially reduce interlaminar shear stress. One example is shown in U.S. Pat. No. 6,112,791, wherein the band element has tapered ends for improving interlaminar shear strength at the ends of the band element. Other prior art band elements have chamfered ends to reduce the interlaminar shear stress at the band ends. However, all of these prior art band elements have a generally constant radial thickness in an axial direction and a rectangular cross section throughout the majority of the axial length of the band element. In these band elements having the constant radial thickness, initiation or onset of interlaminar shear failure is located near the axial midpoint of the band element near the neutral axis.

The inflated ride quality, comfort and harshness of a banded run flat tire is effectively controlled by the circumferential rigidity and bending stiffness of the band element within the central footprint region. The circumferential rigidity necessary for the band element to adequately carry tire loads in both the inflated and uninflated conditions, is largely determined by the bending stiffness of the band element ahead of and behind the central footprint region. Likewise, it is desirable that the band element has increased interlaminar shear strength and increased circumferential strength or stiffness in order to reduce failure of the band.

It has also been learned that band elements having dual stiffness characteristics have been effective in achieving a better run flat tire. A dual stiffness band has variable axial bending stiffness with a lower axial bending stiffness in the central footprint region which improves inflated ride quality, comfort and harshness, yet provides a higher axial bending stiffness ahead of and behind the central footprint region in order to provide the necessary band durability and load carrying capacity. Several band element configurations have been disclosed in the prior art which provide for a dual stiffness result. One such band configuration for providing the dual modulus effect is to use a band element having an anticlastic shape such as shown in U.S. Pat. No. 4,456,084.

SUMMARY OF THE INVENTION

In summary, the present invention provides a run flat tire and in particular a band element therefor, which has increased interlaminar shear strength when the tire is operating both in the inflated and deflated conditions by forming the band of a composite material with a varying radial thickness from the axial midpoint towards the axial ends.

Another feature of the invention is to provide a band element for a run flat pneumatic tire which is formed of a composite material from various types of fibers, preferably graphite, fiberglass or a combination of both, which fibers are in strip materials and are encased in a resin matrix and provided with varying radial thickness to provide the desired stiffness band.

A further aspect of the invention is to provide a band with optimized weight and stiffness by providing the desired radial thickness at the axial midpoint of the band while reducing the radial thickness toward the axial ends thereby decreasing the band weight without sacrificing the interlaminar shear strength and durability.

Still another aspect of the invention is providing a band element wherein the radial thickness varies from the midpoint to the axial ends with the band cross section being symmetrical or non-symmetrical with respect to the neutral axis of the band element.

Another aspect of the invention is to provide a band element wherein the ends have a radial thickness between twenty percent and eighty percent of the midpoint thickness of the band element.

Another feature of the invention is to provide a band element formed of wound layers of resin impregnated materials which form a plurality of layers providing curved axially extending surfaces between the layers within the band, which surfaces cross the neutral axis of the band due to the curvature of the band, to further increase interlaminar shear strength.

Still another aspect of the invention is providing the band with an anticlastic configuration to provide the band element with a dual stiffness. The term "anticlastic" is defined as a double curved shape where the surface curve is concave in one direction and convex in another. This dual stiffness provides an improved ride quality and comfort by having a lower axial bending stiffness in the central footprint region of the tire and provides the required durability and strength by providing a higher axial bending stiffness in the band ahead of and behind the central footprint region as the tire rotates.

Furthermore, the anticlastic band element of the present invention has a concavity within the range of 1/10 to twice the radial thickness of the outer ends of the band element, and preferably has a concavity equal the thickness of the outer ends of the band element.

A further aspect of the invention is to enable the band element to be fabricated by usual methods of fabrication available for prior composite band elements, such as homogenous filament winding, nonhomogenous filament winding, multi-layer tape composite winding, winding with preimpregnated materials, winding with wet woven materials, winding with mats, winding with resin transfer molding processes, winding with wet or preimpregnated woven performs, and combinations of these prior known composite band forming techniques and methods of fabrication.

Another feature of the invention is to provide a band element formed of composite materials which allows tailoring of both stresses and elastic deflection properties by controlling orientation of the fibers and selection of fiber modulii in the strip material.

DESCRIPTION OF THE PREFERRED EMBODIMENTS

Figure 1:
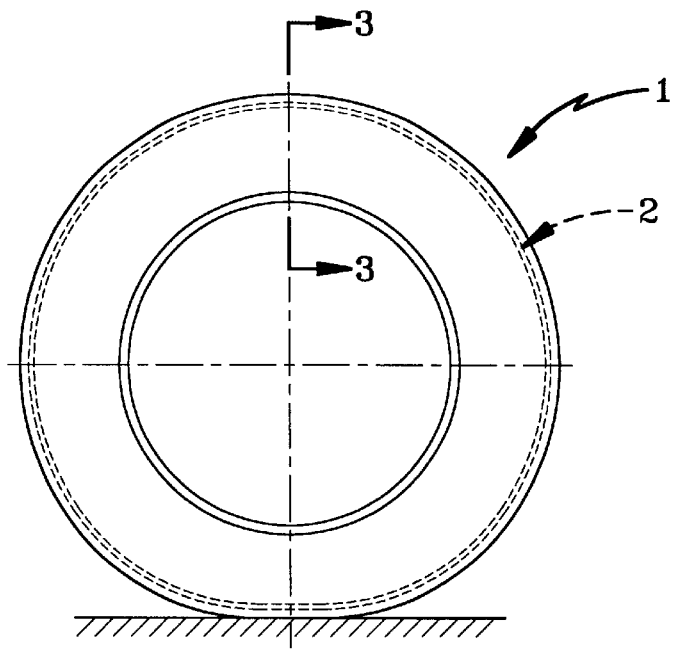
FIG. 1 is a side elevational view of a pneumatic tire containing the improved band element.
Figure 2:
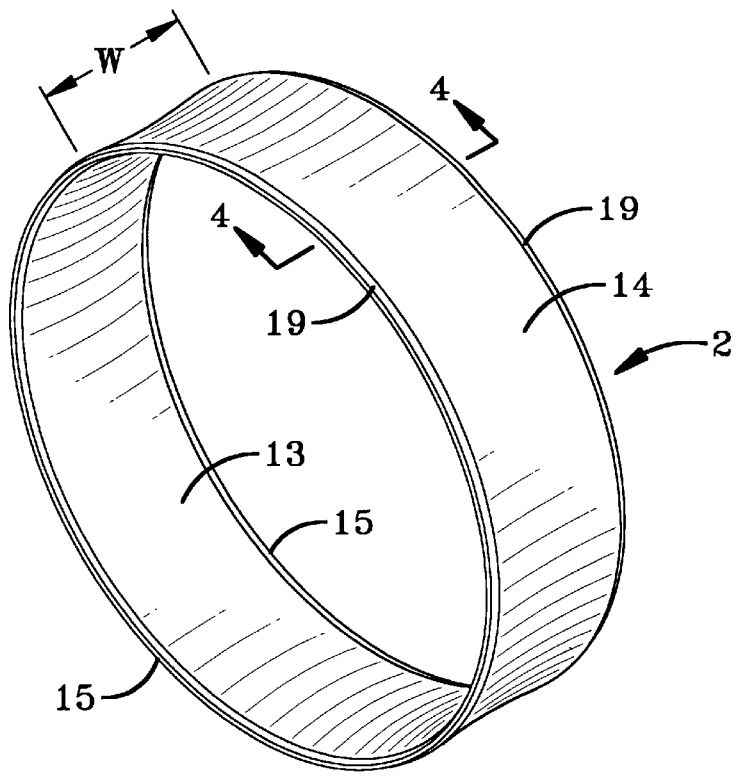
FIG. 2 is an enlarged perspective view of the band element removed from the tire of FIG. 1.

FIG. 1 is a diagrammatic side elevation of a pneumatic tire indicated generally at 1, having the improved run flat band element 2, incorporated therein, hereinafter referred to as band 2. Tire 1 is of a usual construction and includes a body ply carcass 3 (FIG. 3) consisting of an innerliner 4, at least one body ply 5, and sidewalls 6 extending from a crown portion 7 of the tire to bead packages 8. Bead packages 8 will typically include a bead 9 and a bead filler 10, and may have gum abrasion strips and other components therein, all of which are well known in the tire building art. The body ply carcass is assembled and then molded with a typical tread package which will usually contain a tread strip 11 and various reinforcing belts (not shown) contained therein. Band 2 is molded into the crown portion of the tire between the tread 11 and the carcass in a usual tire mold. Bead packages 8 are adapted to be seated with a usual airtight seal on a vehicle rim.

Figure 3:
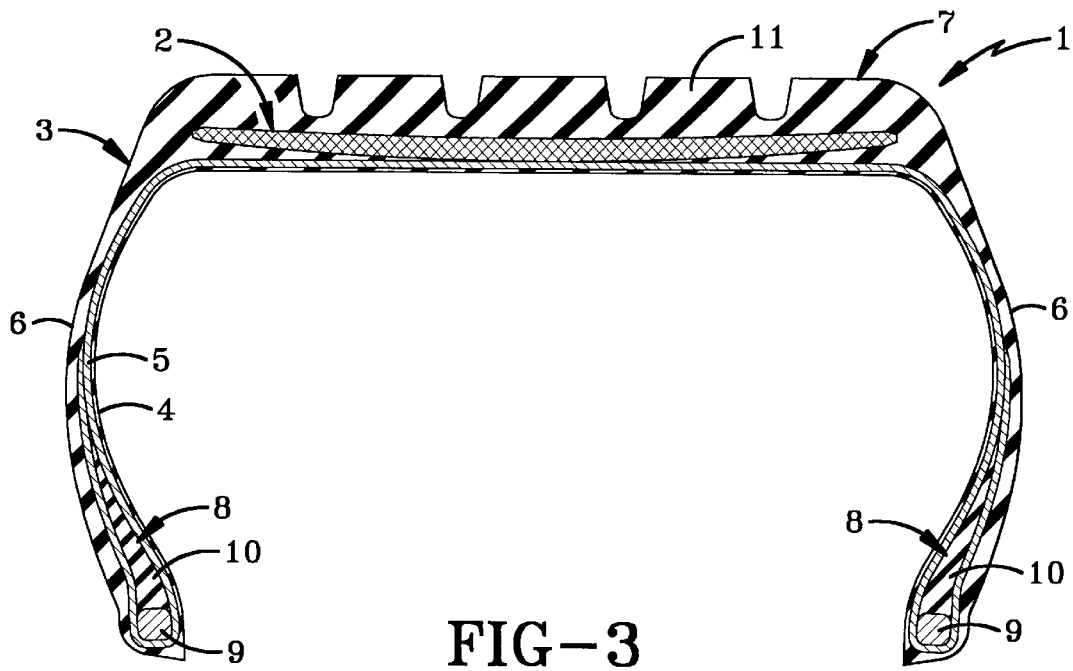
FIG. 3 is an enlarged sectional view taken along lines 3—3, FIG. 1.
Figure 4:
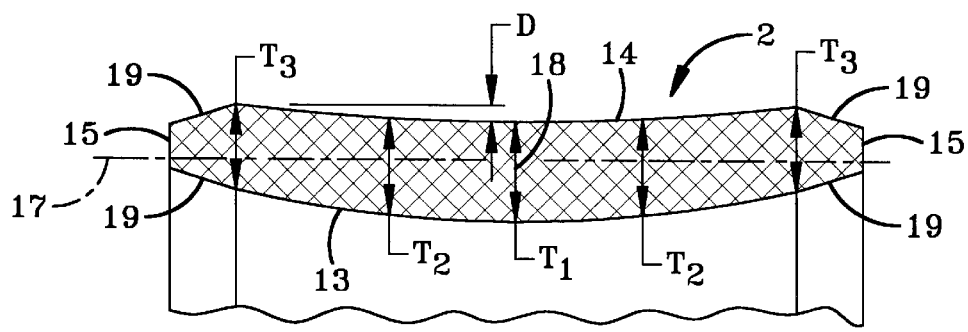
FIG. 4 is an enlarged sectional view of the improved band element taken on line 4—4, FIG. 2 having an exaggerated thickness.

Band 2 has a relatively thin annular uniform configuration with respect to its length as shown in FIG. 3. However, in FIGS. 4–10 the thickness of the band is greatly exaggerated with respect to its length in order to show more clearly the main features of the invention. In the preferred embodiment (FIG. 4) band 2 has a convex inner surface 13 and a concave outer surface 14 which terminate in end edges 15. The band has a neutral axis 17 and a cross-sectional radial thickness $T_1$ at a radial midpoint 18. In accordance with the invention, the cross-sectional radial thickness $T_1$ decreases symmetrically about midpoint 18 toward end edges 15 as shown diagrammatically in FIG. 4. For example, thicknesses $T_2$ are at equal and opposite axial spacing from midpoint 18 and are equal to each other but less than thickness $T_1$ but greater than another thicknesses $T_3$. Thicknesses $T_3$ also are equally spaced axially from midpoint 18 and closer to end edges 15. As shown in FIG. 4, band 2 has chamfered end portions 19 although the same are not required to achieve the advantages of the present invention.

Band 2 has an anticlastic shape with concave surface 14 facing radially outwardly. The extent of concavity is indicated at D and ranges between about 0.1 to about 2.0 times the band end thickness $T_3$ with the preferred concavity D being substantially equal to end thickness $T_3$. However, since the thickness of band element 2 is greatly exaggerated to better illustrate the invention, concavity D does not accurately show this relationship. As the band concavity increases the amount of tread rubber and ultimately tire weight, increases proportional to the concavity. Thus, the limit set forth above is economically believed to be the most feasible and has been found to provide the desired right characteristics and run flat capability. Other advantages of a run flat band having an anticlastic configuration are shown and described in copending U.S. application Ser. No. 09/678,048, which disclosure is incorporated herein by reference.

Figure 4A:
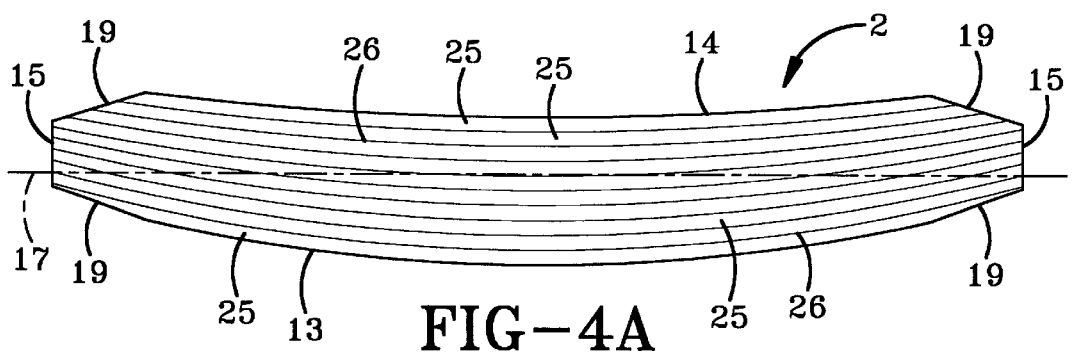
FIG. 4A is a greatly enlarged fragmentary view of FIG. 4 showing the layers of wound material forming the composite band element and the neutral axis of the band passing therethrough.

FIG. 4A shows that band 2 is formed by a plurality of individual layers 25 of resin impregnated fibers or tows forming strip material which is wound radially one on top of the other. Each layer is formed by helically wrapping a thermo plastic or thermoset resin impregnated fiber tow around a mandrel as shown in said copending U.S. application Ser. No. 09/678,048. FIG. 4A shows that each layer 25 forms a plurality of adjacent generally curved surfaces 26 therebetween which heretofore provided an area susceptible to interlaminar shear. However, the curved configuration of the band element shows that the neutral axis 17 extends across the individual surfaces 26 formed between the individual layers 25 of the fiber tows thereby providing the potential of increasing interlaminar shear strength especially when combined with the greater radial thickness at the midpoint of the band. Thus, the feature shown in FIG. 4A of neutral axis 17 crossing through the curved surfaces formed between some of the layers is applicable to many of the other band embodiments shown in FIGS. 6–10 and discussed further below.

Figure 5:
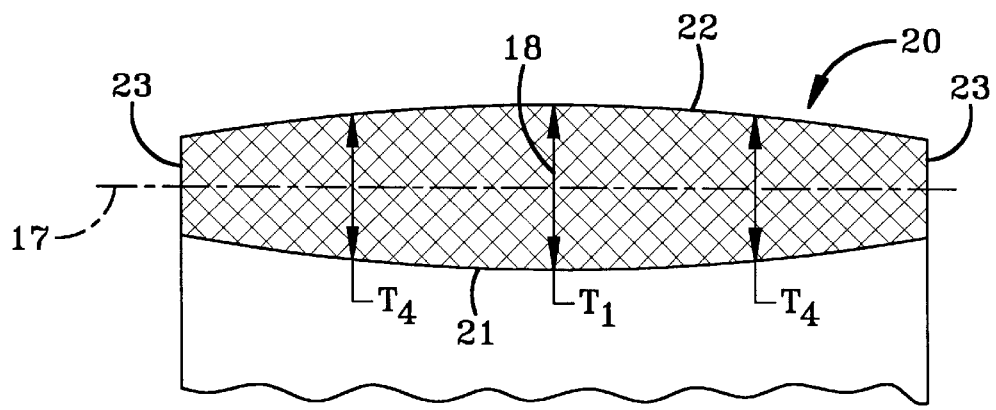
FIG. 5 is a sectional view similar to FIG. 4 with an exaggerated thickness, of a second embodiment of the band element.

A second embodiment of the band element is indicated at 20, and shown in FIG. 5. Band element 20 has inner and outer convex surfaces 21 and 22 respectively, which terminate in radially extending end edges 23. Again, the radial thickness of the band element decreases symmetrically axially outwardly from radial midpoint 18. For example, cross-sectional thicknesses $T_4$ are less than midpoint thickness $T_1$ but greater than the radial thickness at end edges 23. This thickness reduction in band element 20 preferably follows a smooth continuous arcuate path from midpoint 18 to the end edges. In band element 20, neutral axis 17 is centrally located and at equal radial distances from the inner and outer surfaces axially along the band element.

Figure 6:
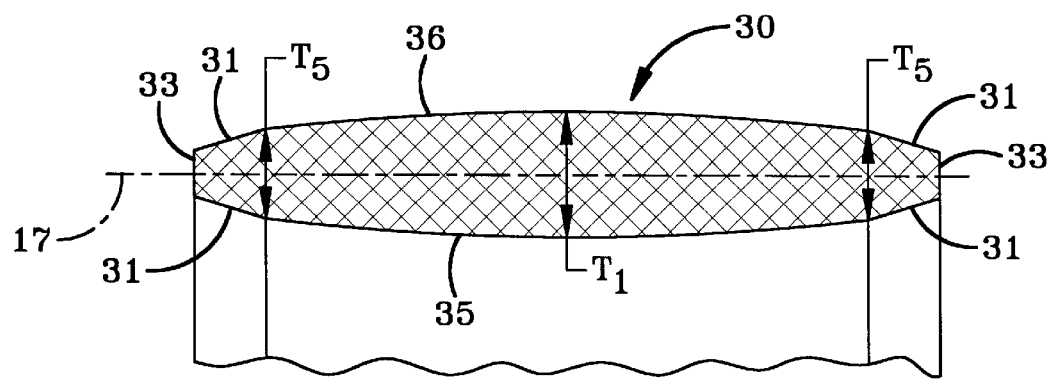
FIG. 6 is a sectional view of a third embodiment of the band element shown with an exaggerated thickness.

Another embodiment of the band element is indicated at 30, and shown in FIG. 6. Embodiment 30 is very similar to embodiment 20 of FIG. 5 with the main difference being that the outer ends are chamfered at 31 before terminating in end edges 33. Again, the radial thicknesses will decrease proportionally from midpoint 18 until reaching thicknesses $T_5$ at chamfers 31. Again, neutral axis 17 is equal distance in a radial direction from inner and outer arcuate surfaces 35 and 36 therethrough the axial length of the band element.

Figure 7:
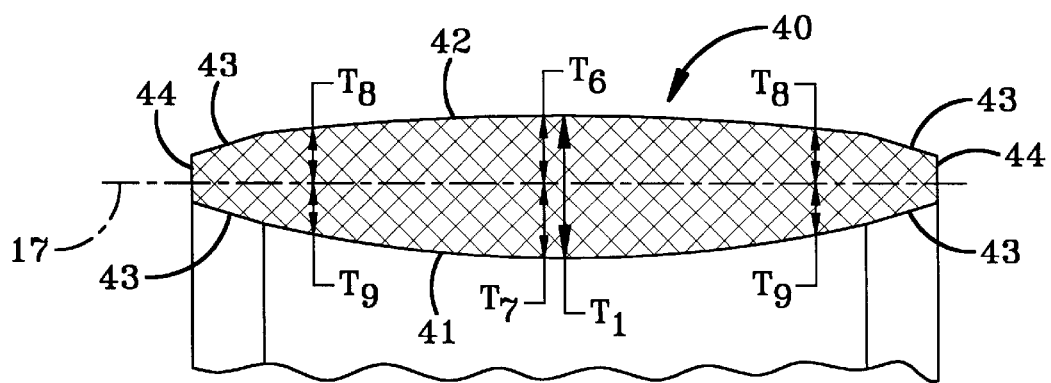
FIG. 7 is a sectional view of a fourth embodiment of the band element shown with an exaggerated thickness.

A fourth embodiment is indicated generally at 40, and shown in FIG. 7. Band element 40 includes convex inner and outer surfaces 41 and 42 respectively, which terminate in chamfered ends 43 and end edges 44. In band element 40 neutral axis 17 is non-symmetrical with respect to inner and outer surfaces 41 and 42.

For example, thickness $T_7$ is greater than thickness $T_6$ at the radial midpoint thickness $T_1$. This same relationship is present axially along the band whereby thickness $T_8$ will be less than thickness $T_9$ since inner surface 41 will have a larger radius of curvature than outer surface 42. However, in accordance with the main principle of the invention, the total radial thickness axially along the band, such as $T_8+T_9$, will be less than the radial midpoint thickness $T_1$. Again, the radial thickness will decrease axially outwardly from $T_1$ preferably in an equal amount on each side of midpoint 18, but unequally with respect to neutral axis 17.

Figure 8:
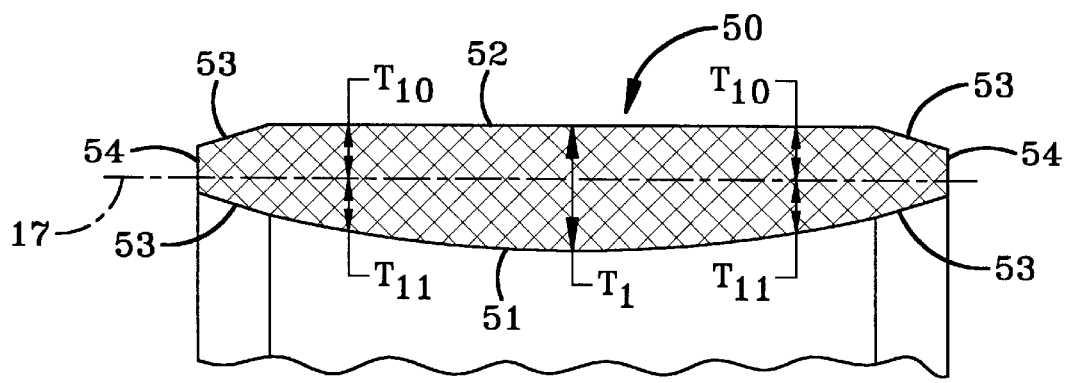
FIG. 8 is a sectional view of a fifth embodiment of the band element shown with an exaggerated thickness.

A fifth embodiment is indicated generally at 50, and is shown in FIG. 8. Band element 50 includes a convex inner surface 51 and an outer substantially flat surface 52. Surface 52 extends throughout the majority of the axial length of the band element before terminating in chamfer ends 53. Surfaces 51 and 52 terminate in chamfered ends 53 and radially extending end edges 54. Neutral axis 17 extends generally parallel with flat outer surface 52 and maintains a generally constant thickness $T_{10}$ therebetween. However, the overall radial thickness, for example $T_{10}$ and $T_{11}$ will decrease from midpoint 18 toward chamfered ends 53 due to inner convex surface 51, and at all axial locations will be less than midpoint distance $T_1$.

Figure 9:
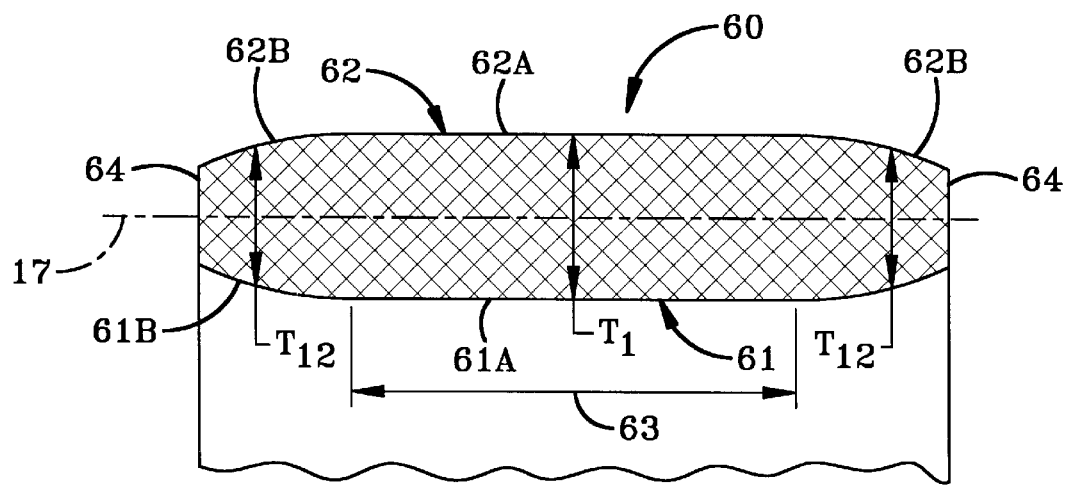
FIG. 9 is a sectional view of a sixth embodiment of the band element shown with an exaggerated thickness.

A sixth embodiment is indicated generally at 60, and is shown in FIG. 9. Band element 60 includes inner and outer surfaces 61 and 62, each of which has a relatively flat central portion 61A and 62A, respectively, which extend for an axial distance 63 and then terminate into curved surfaces 61B and 62B which provides for the reduced axial thickness $T_{12}$ with respect to midpoint distance $T_1$. Surfaces 61 and 62 terminate in radially extending flat end surfaces 64.

Figure 10:
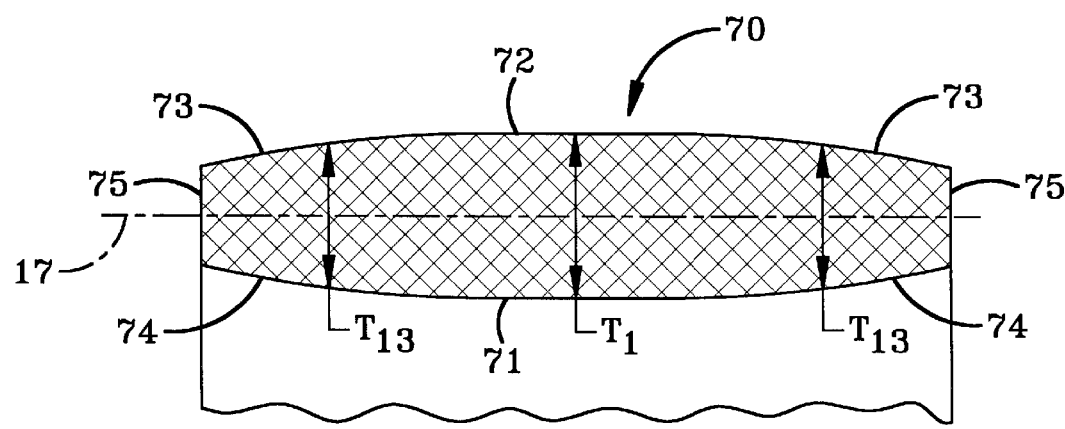
FIG. 10 is a sectional view of a seventh embodiment of the band element shown with an exaggerated thickness.

A seventh embodiment is indicated generally at 70 and shown in FIG. 10. Band element 70 includes inner and outer surfaces 71 and 72, respectively, which differ from the previously described band surfaces in that they are of a non-circular arcuate configuration, that is, they do not have a single radius for inscribing the surfaces but have an elliptical configuration which then terminates in more arcuate shaped ends 73 and 74 respectively. However, the radial thicknesses, for example at $T_{13}$, will be at least equal to and at some location will decrease as the surfaces move toward end edges 75 with respect to the midpoint thickness $T_1$.

In summary, the various band element embodiments shown above will have inner and outer surfaces having a maximum radial thickness at the midpoint of the band and at axially spaced locations will decrease equally in thicknesses toward the outer end edges. Although the outer end edges are shown in all of the embodiments as being flat radially extending surfaces, the end edges could be tapered more into a rounded edge end such as shown in U.S. Pat. No. 6,112,791, without affecting the concept of the invention. As shown in FIG. 4A, the band elements are formed in layers by winding elongated strips of reinforced fiber tows preferably formed of fiberglass, graphite or a combination thereof and impregnated with a thermoset or thermoplastic resin, about a mandrel, in a similar manner as shown and described in copending U.S. application Ser. No. 09/678,048. Likewise, as shown in FIG. 4A, many of the embodiments, especially those having a nonsymmetry with respect to the neutral axis, will result in neutral axis 17 crossing some of the layers of the strips, increasing further the interlaminar shear strength of the band element. Likewise, the anticlastic shape of embodiment 2 of FIG. 4 provides a dual stiffness to the band which further increases fatigue life.

The extent of radial thickness variation in the axial direction of the band elements discussed above can be broadly characterized as having an outer thickness prior to any chamfer, between 20% and 80% of midpoint thickness 18, with the preferred being 50%. Likewise, as discussed above and shown in the figures, the advantages of the improved band element having the decreasing radial thickness provides a latitude for the specifics of the profiles of the outer and inner surfaces. These surfaces can be circular, elliptical or of a higher order geometric profile and can include straight sections parallel with the neutral axis prior to one or both of the surfaces moving towards the neutral axis to provide for the reduced radial thickness. It is readily understood that other surfaces than those shown in the various embodiments could be utilized without affecting the concept of the invention. This variable radial thickness provides the ability to match the band element and in particular the interlaminar shear strength, to the interlaminar shear stress in an axial sense to achieve various characteristics to the band element, and subsequently to a pneumatic tire in which it is embedded.

While the embodiments of the invention have been described, the invention should not be limited thereto and is set forth specifically in the accompanying claims.

What is claimed is:

1. A pneumatic tire including an elastomeric casing with a tread formed in a crown portion thereof and sidewalls extending from the crown portion to generally annular beads adapted to normally seat themselves in an airtight secured relationship with a wheel; an annular band embedded in the crown portion having an axial width and a radial cross-sectional thickness with a neutral axis extending generally through the center of the band in an axial direction, said band being a composite member formed of a plurality of wound layers of an elongated strip of fibers impregnated with a resin matrix material and having inner and outer annular generally axially extending surfaces terminating in a pair of outer ends, wherein the radial thickness of the band continuously decreases from an axial midpoint of the band to said outer ends.

2. The pneumatic tire defined in claim 1 in which the outer ends of the band are chamfered toward a pair of end edges.

3. The pneumatic tire defined in claim 1 in which the outer ends terminate in end edges which are flat radially extending surfaces.

4. The pneumatic tire defined in claim 1 in which the cross-sectional thickness of the band is nonsymmetrical about the neutral axis.

5. The pneumatic tire defined in claim 4 in which the cross-sectional thickness of the band is greater between the inner surface and neutral axis than between the outer surface and the neutral axis in a radial direction.

6. The pneumatic tire defined in claim 5 in which the majority of the outer surface is substantially flat and parallel to the neutral axis of the band.

7. The pneumatic tire defined in claim 4 in which the outer surface is concave and the inner surface is convex to provide a generally anticlastic shape to the band.

8. The pneumatic tire defined in claim 7 in which the outer ends of the band are chamfered.

9. The pneumatic tire defined in claim 8 in which the outer ends terminate in flat radially extending end surfaces.

10. The pneumatic tire defined in claim 7 in which the concavity of the outer surface is within the range of about 0.1 to about 2.0 times the thickness of the outer ends of the band measured prior to any chamfer or taper of said outer ends.

11. The pneumatic tire defined in claim 10 in which the concavity is substantially equal to the thickness of the outer ends of the band.

12. The pneumatic tire defined in claim 1 in which the fibers are impregnated with a thermoplastic or thermoset resin and formed of fiberglass or graphite or a combination of both.

13. The pneumatic tire defined in claim 1 in which the band has a maximum radial thickness at the axial midpoint of the band and decreases in radial thickness at the outer ends measured prior to any chamfer or taper of said outer ends to within a range of between 20% and 80% of thickness T.

* * * * *